United States Patent [19]
Conz

[11] 3,803,870
[45] Apr. 16, 1974

[54] MACHINE FOR THE INSTANTANEOUS PRODUCTION OF ICE CREAM OF ONE OR MORE FLAVOURS

[75] Inventor: Loris Conz, Pordenone, Italy

[73] Assignee: Costruzioni Meccaniche COSMEC di Pighin e Conz S.n.c., Pardenone, Italy

[22] Filed: Oct. 5, 1971

[21] Appl. No.: 186,716

[30] Foreign Application Priority Data
Oct. 15, 1970 Italy .................................. 31038/70

[52] U.S. Cl. .................. 62/342, 222/135, 141/104, 141/105
[51] Int. Cl. ............................................. F25c 7/12
[58] Field of Search ...... 62/342, 303; 222/132, 135, 222/145, 146; 141/100, 101, 104, 105

[56] References Cited
UNITED STATES PATENTS

| 3,323,320 | 6/1967 | Conz | 62/303 |
| 3,279,205 | 10/1966 | Stoelting | 62/342 |
| 2,426,368 | 8/1947 | Mayne et al. | 62/342 |
| 2,226,979 | 12/1940 | Rahauser | 62/342 UX |
| 2,848,019 | 8/1958 | Corbin et al. | 141/100 |
| 1,681,929 | 8/1928 | De Armond et al. | 141/104 X |
| 1,814,167 | 7/1931 | Laird | 62/303 X |
| 2,726,026 | 12/1955 | Gould et al. | 141/104 |

Primary Examiner—William E. Wayner
Assistant Examiner—William E. Tapolcai, Jr.
Attorney, Agent, or Firm—Holman & Stern

[57] ABSTRACT

A machine for the automatic production of ice cream in which a plurality of tanks for flavouring substances are connected with a freezing chamber through duct and valve means, and means are provided so that the total amount of flavouring substances delivered for each unit batch of ice cream produced is constant, independently from the number of types of flavouring substances delivered.

1 Claim, 3 Drawing Figures

PATENTED APR 16 1974 3,803,870
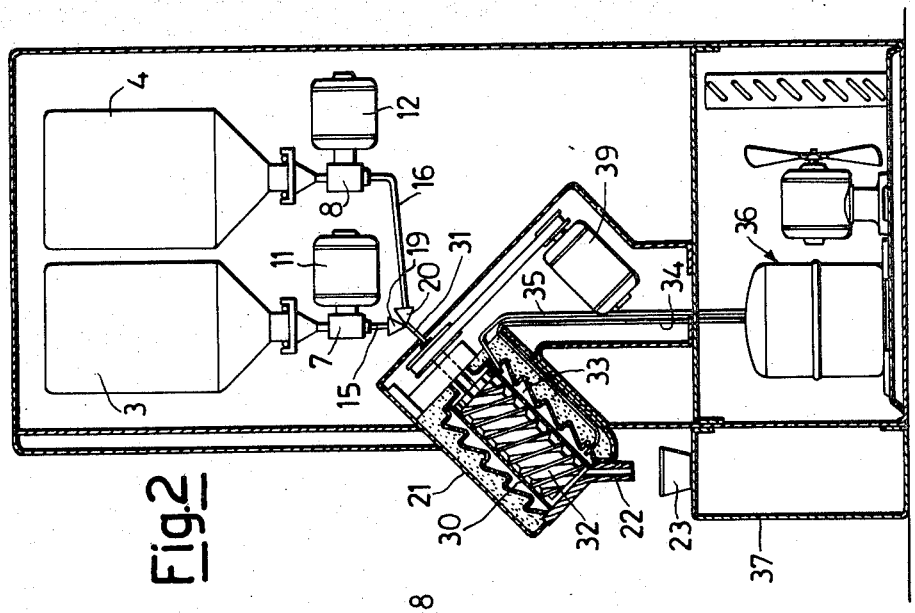
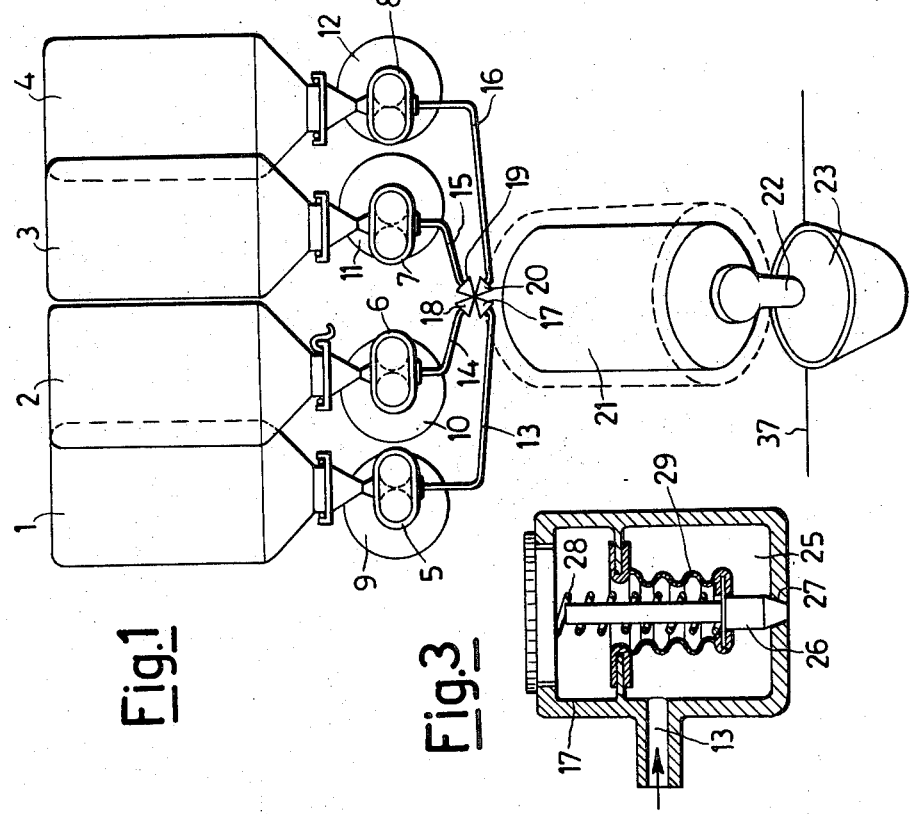
INVENTOR.
Loris Cong
by Holman & Stern

MACHINE FOR THE INSTANTANEOUS PRODUCTION OF ICE CREAM OF ONE OR MORE FLAVOURS

BACKGROUND OF THE INVENTION

The present invention relates to a machine for the instantaneous automatic production of ice creams of one or more flavours.

PRIOR ART

In machines for the instantaneous production of ice creams presently in use (in particular in screw machines), the flavoured liquids to be frozen are introduced manually. This means that the end product is not always constant, either from the point of view of the quantity of ice cream obtained or the proportions of the different flavoured liquids in the case of multi-flavoured ice cream. Manual introduction also means that the operator must be continually present.

OBJECTS AND SUMMARY OF THE INVENTION

The object of the present invention is to provide an automatic machine for the instantaneous production of ice creams of one or more flavours, the use of which does not require the continuous presence of the operator and which guarantees constancy of products, while respecting the due hygienic standards both during operation and during rest periods.

The machine according to the invention includes a freezing chamber having a power driven rotatable screw therein, a refrigerating chamber surrounding the freezing chamber, an inlet and an outlet communicating with the freezing chamber, means for feeding flavored liquid to the inlet of the freezing chamber, said feeding means being defined by a plurality of tanks, each tank containing a different flavored liquid capable of being transformed into ice cream in the freezing chamber, a feed duct including a metering pump and a non-return valve providing communication between each tank and the inlet of the freezing chamber, with said non-return valve also serving as an injection valve to regulate the quantity of flavoured ice cream produced and said metering pumps being regulated so that the sum of the quantities of flavoured liquid-delivered by the metering pumps for each single "unit batch" of ice cream is constant so as to make the quantity of ice cream produced at each single operation of the machine constant.

In such machines a unit batch of ice cream is divided into as many parts as there are tanks of flavoured liquid, i.e., each metering pump delivers a quantity of liquid which, when added to the quantities of liquid delivered by the other metering pumps makes up a single unit batch of ice cream. If, for example, the machine is provided with four tanks containing liquids of different flavours, then on operating the four corresponding metering pumps, a unit batch of ice cream is obtained, consisting of ice creams of four different flavours. This unit batch may be in the form of distinct or mixed flavours according to whether the metering pumps are operated one after the other or simultaneously. If, from the same machine, a batch of ice cream is required consisting of two ice creams of different flavours, each of the two corresponding metering pumps must be operated twice. If an ice cream of only one flavour is required, a single metering pump is operated four times, leaving the others in the rest position.

If required the device for feeding the machine, according to the invention, may also include an additional part for washing the machine at the end of production of each unit batch of ice cream in order to cleanly separate the flavours of one unit batch from the flavours of the batch which follows. Said additional part comprises a tank filled, for example, with sweetened water, in communication with the freezing chamber of the machine by way of a metering pump and a valve with, said metering pump being operable automatically at the end of production of each unit batch of ice cream or at intervals according to the wishes of the operator.

The characteristics of the present invention will be more evident from the detailed description given of one embodiment of the machine according to the invention, with reference to the accompanying drawing in which:

BRIEF DESCRIPTION OF THE DRAWINGS

FIG. 1 is a frontal diagrammatical view of the machine according to the invention;

FIG. 2 is a diagrammatical lateral view partially in section of the machine according to the invention; and FIG. 3 is a sectional view of a valve contained in the machine according to the invention.

DETAILED DESCRIPTION OF THE INVENTION

The figures show an embodiment of the machine according to the invention in which the feed device comprises four tanks 1, 2, 3 and 4, the first three containing liquids flavoured with different flavours and the fourth containing sweetened wash water. The tanks are in communication with a freezing chamber of a common screw machine 21 for the instantaneous production of ice cream by way of four feed ducts 13, 14, 15 and 16 incorporating four metering pumps 5, 6, 7, 8 and four valves, 17, 18, 19 and 20 respectively.

The metering pumps consist of gear pumps driven by electric motors controlled by a push button selector which is not illustrated in the figures nor described as it is of conventional type. It could be, for example, a push button selector of the traditional type as used in token or coin vending machines.

The valves 17, 18, 19 and 20 are non-return or injection valves and are all similar and only pass that quantity of liquid metered as they open according to the pressure generated by the metering pump and close immediately when it ceases, so that the liquid passes only in one direction and not in the opposite direction so as to avoid back flow to the metering pumps. An internal chamber 25 houses a pin 26 which closes a tapered hole 27 by the thrust received by a spring 28. A deformable member or belows 29 acting on the pin in the direction opposite to that of the spring 28 is also present. The hole 27 places the internal chamber 25 of the valve into communication with an inlet duct 31 (common to the four non-return valves) of a freezing chamber 30 of the screw machine, and a second hole allows the flavoured liquid from the duct 13 to enter the chamber 25. The chamber 25 is normally full of liquid of the same flavour as that from the duct 13 and the deformation of the member 29 is such as to maintain the pin 26 in the position shown in FIG. 3, i.e., to keep the hole 27 closed. The injection of a further quantity of liquid from the duct 13 causes deformation of the member 29 with consequent upward movement of the pin 26 and opening of the hole 27, which, when opened, allows the flow from the chamber 25 of a quantity of liquid equal to that arriving from the duct 13. When the liquid from the duct 13 ceases to arrive, the pin 26 closes the hole 27 thus stopping outflow of liquid and avoiding any back flow of liquid towards the metering pump. Moreover, absence of liquid in the duct 31 is assured during non-delivery periods of the metering pump.

The freezing chamber 30 is incorporated in a conventional machine 21 for the instantaneous production of ice cream provided with a cylindrical screw 32 having its axis inclined to the horizontal, with the screw being driven by a motor 39 fixed to the machine casing. Around the chamber 30 is disposed a refrigeration chamber 33 to which feed duct 34 and discharge duct 35 of the refrigeration plant are connected and whose main components 36 are disposed in base 37 of the housing which contains the machine. The chamber 30 is closed by a bottom provided with a nozzle 22 from which the ice cream flows. A container 23 located on the base 37 collects the ice cream as it is produced.

The operation of the machine according to the invention is as follows: the push button selector is operated according to the choice of type of ice cream required (e.g., three flavours separate one from the other), then the three motors 9, 10 and 11 start and drive the pumps 5, 6 and 7. Then equal quantities of liquids of three different flavours are fed successively into the freezing chamber and freeze on contact with the internal wall of the freezing chamber (which is cooled by the refrigerant fluid which circulates in the refrigeration chamber 33), the screw scrapes the ice cream thus obtained away from said wall and conveys it towards the nozzle 22, from which it flows in the form of ice cream of three different flavours.

If the same quantity of ice cream is required but all of the same flavour, only one pump (e.g., the pump 5) is operated but for the whole time necessary for the production of the entire unit batch of ice cream. If, for example, each pump has to make one revolution to produce a batch of ice cream of three flavours, then to produce the same batch of ice cream of only one flavour, the pump in the duct carrying the liquid of that flavour must make three revolutions, while the others remain stationary.

Similarly if an ice cream of two flavours is required, a first pump will make two revolutions, a second pump will make one revolution and the third pump will remain stationary. Finally, if ice cream is required with a number of flavours mixed together, the corresponding metering pumps are operated together.

If, at the end of production of a unit batch of ice cream, it is required to wash the machine and especially the chamber 30, the screw 32 and nozzle 22, the motor 12 which drives the pump 8 is started, and emulsified wash water is fed whice effects an efficient cleaning of those parts of the machine contacted by liquids or frozen mixtures of different flavours.

The feeding device for the machine according to the invention, may further comprise another tank for liquid connected to the freezing chamber by means of a feed duct incorporating a metering pump and non-return valve. Between said metering pump and valve is inserted an emulsifier in which water is mixed with a flavouring powder (e.g., powdered coffee) from another feed duct having a metering pump. In this manner, it is possible to prepare ice cream from a liquid and a powder instead of directly from an already flavoured liquid. In this case, the pump regulates the flow of liquid and another device regulates the flow of powder.

The emulsifier may also be inserted downstream of the non-return valve. In that case, the emulsifier is fed through two inlet ducts, one from a tank of liquid and equiped with a metering pump and non-return valve, and the other from a tank of flavouring powder and having a metering pump. The emulsifier is also provided with an outlet duct through which mixture of liquid and powder passes into the freezing chamber.

The tanks may be completely closed, possibly with an inert gas at pressure, or may be provided with pipes which connect the liquid to atmosphere so as to permit liquid flow to the pump. If the liquids held in these tanks can deteriorate, the tanks may be placed in a suitably refrigerated environment. If their composition or density is such as to form deposits or irregular component distribution, said tanks may be provided with suitable mixers. The metering pumps of the gear pump type may be substituted by metering devices comprising solenoid valves etc. The non-return valves may also be different to those shown in FIG. 3.

The main characteristic of distributing the unit batch in successive parts which may be of one or more distinctly separate or mixed flavours is evident.

What is claimed is:

1. A machine for the instantaneous production of ice creams of one or more flavours, comprising a freezing chamber having a power-driven rotatable screw therein, a refrigerating chamber surrounding the freezing chamber, an inlet and an outlet communicating with the freezing chamber, means for feeding flavoured liquid to the inlet of the freezing chamber, said feeding means being defined by a plurality of tanks, each tank containing a different flavoured liquid capable of being transformed into ice cream in the freezing chamber, a feed duct including a metering pump and a non-return valve providing communication between each tank and the inlet of the freezing chamber, said non-return valve also serving as an injection valve to regulate the quantity of flavoured ice cream produced and the metering pumps being regulated so that the sum of the quantities of flavoured liquid delivered by the metering pumps for each single batch of ice cream is constant to make the quantity of ice cream produced at each single operation constant.

* * * * *